June 21, 1927.
A. H. SNYDER
1,633,137
APPARATUS FOR VENTILATING RECTIFIERS, BATTERIES, AND THE LIKE
Filed July 17, 1924      2 Sheets-Sheet 1
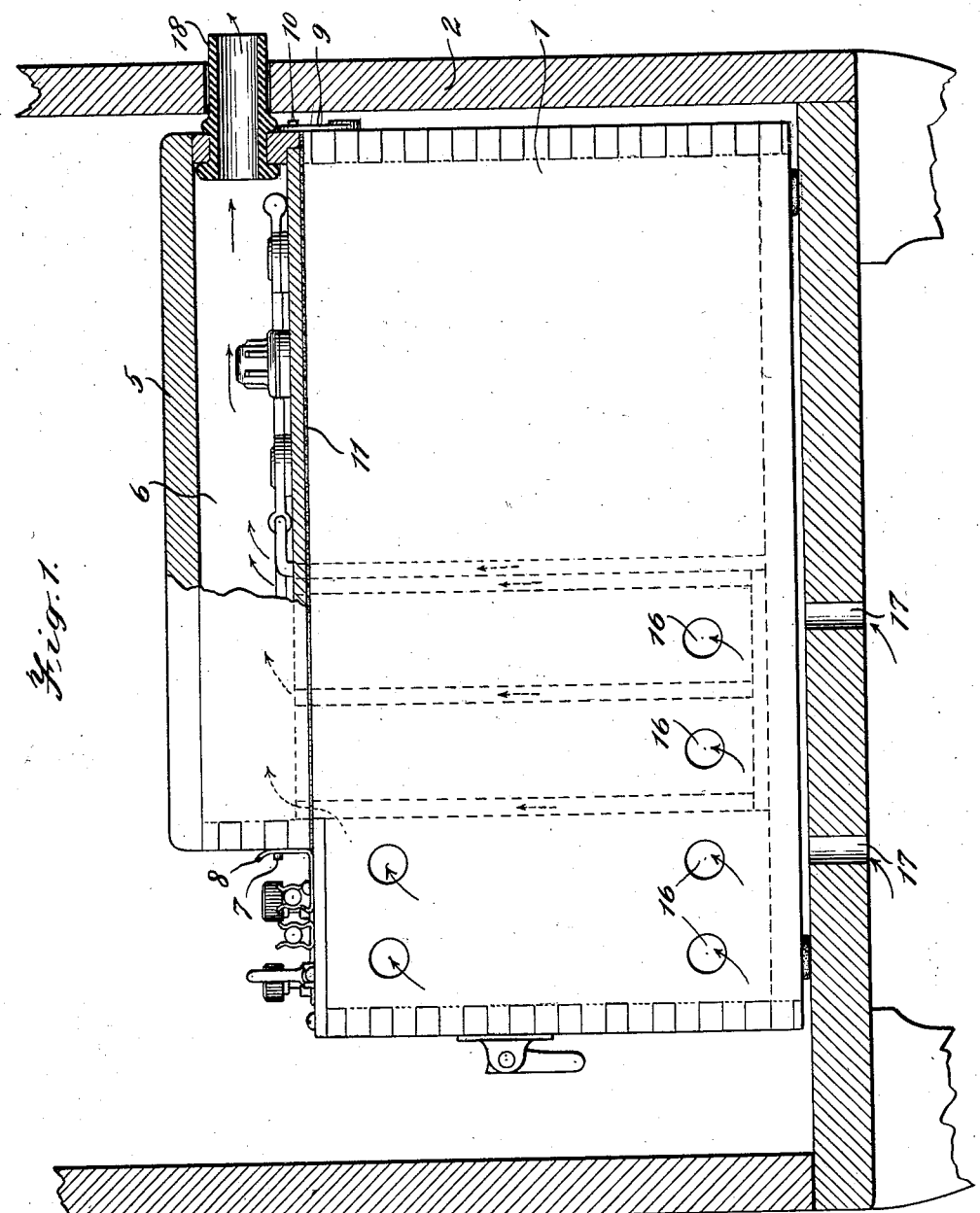
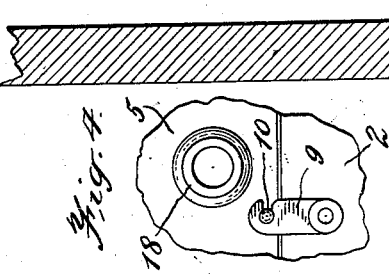

June 21, 1927.  A. H. SNYDER  1,633,137
APPARATUS FOR VENTILATING RECTIFIERS, BATTERIES, AND THE LIKE
Filed July 17, 1924  2 Sheets-Sheet 2
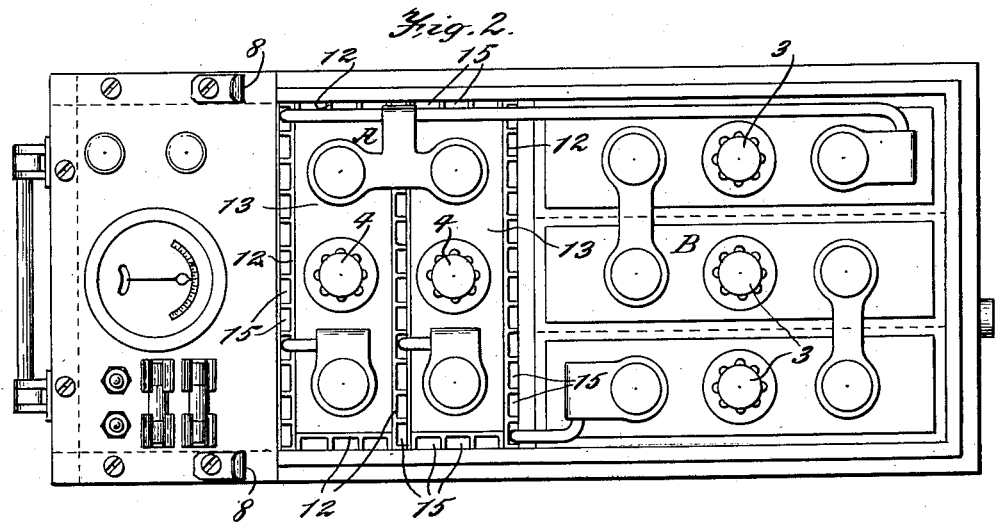
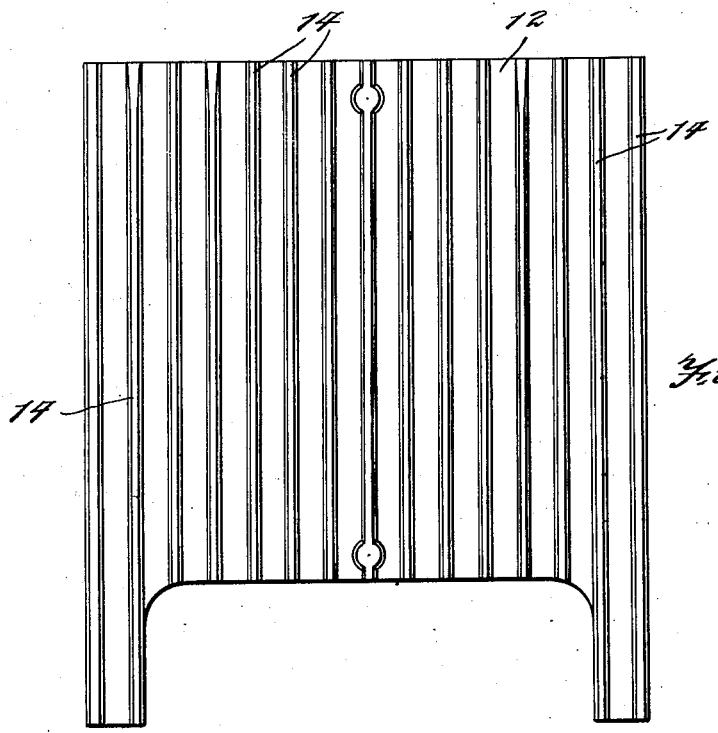

Patented June 21, 1927.

1,633,137

UNITED STATES PATENT OFFICE.

ALMOND H. SNYDER, OF LANCASTER, NEW YORK, ASSIGNOR, BY MESNE ASSIGNMENTS, TO GOULD STORAGE BATTERY COMPANY, INC., OF NEW YORK, N. Y., A CORPORATION OF NEW YORK.

APPARATUS FOR VENTILATING RECTIFIERS, BATTERIES, AND THE LIKE.

Application filed July 17, 1924. Serial No. 726,582.

In the employment of electrolytic rectifiers and storage batteries, gases are evolved which while small in quantity, nevertheless, damage any metallic surface with which they contact unless they are quickly distributed through the atmosphere. This difficulty is particularly objectionable in batteries and rectifiers which are confined in cabinets, such for instance, as combined radio and phonograph cabinets. Unless these gases are prevented from being discharged into the phonograph cabinet, the metal forming the driving motor for the phonograph and the metallic parts of the radio set will be greatly damaged and eventually rendered inoperative.

I have therefore devised means whereby the gases from the rectifier and/or battery are conducted outside of the cabinet and discharged to the open air.

My invention will better be understood by reading the following description taken in connection with the accompanying drawings, and in which:

Fig. 1 is a side elevation, partly in section, of a combined rectifier and battery unit, showing the enclosing cabinet in section;

Fig. 2 is a plan view of the rectifier and battery unit;

Fig. 3 is an elevation of one of the cooling plates; and

Fig. 4 is a fragmentary view showing fastening means.

Referring to Fig. 1, the container 1, in which the rectifier A and battery B and the auxiliary apparatus therefor are placed, is in a cabinet 2 of any desired construction. The battery and rectifier have the usual vent caps 3 and 4, respectively, from which the gases escape. The container 1 is provided with a cover 5 which tightly fits the container so as to provide a space 6 for the gases of the rectifier and battery. This cover is provided with a pin member 7 which passes through an opening in a member 8 which acts to hold one end of the cover tightly in place. The other end is held by the catch 9 (Fig. 4) which is attached to the container 1 and receives a pin 10 on the cover 5. Preferably a gasket 11 is placed between the cover and container so as to render the space 6 tight.

Plates 12, preferably of metal, are placed around the rectifier cells 13. These plates have ribs 14 thereon thus providing channels 15 through which air or other cooling fluid may circulate. The container 1 is provided with openings 16 and the cabinet 2 with openings 17 through which air may enter and pass through the channels 15 into the space 6. The cover 5 is provided with an opening in which a member 18 is placed and through which the air and gases are discharged from the space 6. The member 17 extends through an opening in the cabinet 2 and thus directs the gases outside of the cabinet.

The general direction of the movement of air is indicated by the arrows in Fig. 1. Obviously the openings in the sides of the cabinet and container may be changed or varied to suit conditions and other changes in the details of the parts may be made without departing from the spirit of my invention. Any form of spacing plate may be used to provide the channels 15, but I prefer the construction shown, as that gives an efficient transfer of heat from the rectifying cell, which is relied upon to cause the circulation of air in the direction indicated.

I claim:

1. In combination, a plurality of electrolytic cells, a container therefor having air inlets, a cover for said container providing space above said cells, an outlet in said cover extending beyond said cover wall and heat transmitting means adjacent a portion of said cells adapted to cause a circulation of air from within said container to a point removed from said cover.

2. In combination, a plurality of electrolytic cells, a container therefor having an air inlet therein, a cover for said container providing space above said cells and having an outlet extending beyond said cover wall, and flanged metal plates adjacent a portion of said cells adapted to transmit heat from said cells to the surrounding air to cause circulation therein and discharge of gases from within said container to a point removed therefrom.

3. In combination, a cabinet and a power unit adapted to be received thereby, said power unit including a plurality of electrolytic cells, a covered container therefor, a vent from said container through the wall of said cabinet and metal heat plates adjacent a portion of said cells adapted to form and heat columns of air within said container to cause circulation of air from within the container to a point without said cabinet.

4. In combination, a radio cabinet and a power unit adapted to be received thereby, said unit including a storage battery, a rectifier for charging said battery and a cover adapted to form a closed chamber above said unit, said unit being provided with a plurality of openings and partitions adjacent said rectifier to form free columns of air, said cover having therein a vent opening leading to a point without said cabinet, the arrangement of said openings and partitions being such that the heat generated by said rectifier will cause a circulation of air from within said unit to a point without said cabinet.

5. In combination, a radio receiving set, a cabinet therefor and a power unit device adapted to be installed in said cabinet for supplying said receiving set, said power unit including a rectifying cell and storage battery, a container therefor provided with air inlets, a cover for said container providing a space above said cell and battery having an outlet extending through the wall of said cabinet and heat transmitting means adjacent said rectifying cell adapted to form heated columns of air and cause a circulation of air and gas from within said container to without said cabinet.

ALMOND H. SNYDER.